(12) United States Patent
Issa et al.

(10) Patent No.: US 7,730,216 B1
(45) Date of Patent: Jun. 1, 2010

(54) SYSTEM AND METHOD OF SHARING CONTENT AMONG MULTIPLE SOCIAL NETWORK NODES USING AN AGGREGATION NODE

(75) Inventors: Alfredo Issa, Apex, NC (US); Richard Walsh, Raleigh, NC (US); Christopher Amidon, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 522 days.

(21) Appl. No.: 11/639,104

(22) Filed: Dec. 14, 2006

(51) Int. Cl.
G06F 15/16 (2006.01)
G06F 12/00 (2006.01)

(52) U.S. Cl. ........................... 709/250; 709/214
(58) Field of Classification Search ......... 709/214–223, 709/229, 250
See application file for complete search history.

(56) References Cited

U.S. PATENT DOCUMENTS

| | | |
|---|---|---|
| 5,220,657 A | 6/1993 | Bly et al. |
| 5,517,617 A | 5/1996 | Sathaye et al. |
| 5,629,980 A | 5/1997 | Stefik et al. |
| 5,754,939 A | 5/1998 | Herz et al. |
| 5,884,035 A | 3/1999 | Butman et al. |
| 6,073,138 A | 6/2000 | De l'Etraz et al. |
| 6,088,702 A | 7/2000 | Plantz et al. |
| 6,151,624 A | 11/2000 | Teare et al. |
| 6,260,069 B1 | 7/2001 | Anglin |
| 6,275,819 B1 | 8/2001 | Carter |
| 6,311,194 B1 | 10/2001 | Sheth et al. |
| 6,314,409 B2 | 11/2001 | Schneck et al. |
| 6,338,086 B1 | 1/2002 | Curtis et al. |
| 6,389,409 B1 | 5/2002 | Horovitz et al. |
| 6,389,541 B1 | 5/2002 | Patterson |
| 6,421,439 B1 | 7/2002 | Liffick |
| 6,442,693 B1 | 8/2002 | Sandgren et al. |
| 6,463,433 B1 | 10/2002 | Baclawski |
| 6,480,885 B1 | 11/2002 | Olivier |
| 6,498,795 B1 | 12/2002 | Zhang et al. |

(Continued)

FOREIGN PATENT DOCUMENTS

EP   1 338 966 A3   8/2003

(Continued)

OTHER PUBLICATIONS

Unpublished U.S. Appl. No. 11/516,231, filed Sep. 6, 2006.

(Continued)

*Primary Examiner*—Zarni Maung
(74) *Attorney, Agent, or Firm*—Withrow & Terranova, PLLC (57) ABSTRACT

The present invention generally relates to communication and controlled sharing of digital content among networked users, and is more particularly concerned with creation of an improved sharing network for relaying data among linked nodal members of a social network. An ad hoc network may be a hybrid P2P network that conforms to a virtual peer representation accessible as a single node from outside the given social network nodes. Members of a pre-existing social network may selectively activate embedded latent peers and link to an aggregation node to form a hybrid P2P network. Content may be shared in a controlled distribution according to level rights among participating network nodes. Playlists and/or specialized user interfaces may also be employed to facilitate content sharing among social network members of a virtual peer.

12 Claims, 5 Drawing Sheets

U.S. PATENT DOCUMENTS

| | | |
|---|---|---|
| 6,519,629 B2 | 2/2003 | Harvey et al. |
| 6,525,747 B1 | 2/2003 | Bezos |
| 6,553,367 B2 | 4/2003 | Horovitz et al. |
| 6,560,578 B2 | 5/2003 | Eldering |
| 6,567,122 B1 | 5/2003 | Anderson et al. |
| 6,581,072 B1 | 6/2003 | Mathur et al. |
| 6,594,693 B1 | 7/2003 | Borwankar |
| 6,629,100 B2 | 9/2003 | Morris et al. |
| 6,630,944 B1 | 10/2003 | Kakuta et al. |
| 6,631,098 B2 | 10/2003 | Chang et al. |
| 6,651,086 B1 | 11/2003 | Manber et al. |
| 6,687,732 B1 | 2/2004 | Bector et al. |
| 6,701,362 B1 | 3/2004 | Subramonian et al. |
| 6,748,420 B1 | 6/2004 | Quatrano et al. |
| 6,757,517 B2 | 6/2004 | Chang |
| 6,772,160 B2 | 8/2004 | Cho et al. |
| 6,785,704 B1 | 8/2004 | McCanne |
| 6,816,906 B1 | 11/2004 | Icken et al. |
| 6,832,245 B1 | 12/2004 | Isaacs et al. |
| 6,839,680 B1 | 1/2005 | Liu et al. |
| 6,854,069 B2 | 2/2005 | Kampe et al. |
| 6,917,944 B1 | 7/2005 | Prasad et al. |
| 6,957,193 B2 | 10/2005 | Stefik et al. |
| 6,959,290 B2 | 10/2005 | Stefik et al. |
| 6,970,444 B2 | 11/2005 | Chwieseni et al. |
| 6,970,840 B1 | 11/2005 | Yu et al. |
| 6,980,993 B2 | 12/2005 | Horvitz et al. |
| 6,988,096 B2 | 1/2006 | Gupta et al. |
| 6,988,127 B2 | 1/2006 | Matsuda et al. |
| 6,993,564 B2 | 1/2006 | Whitten, II |
| 7,016,307 B2 | 3/2006 | Vasudev et al. |
| 7,024,391 B2 | 4/2006 | Burich |
| 7,043,644 B2 | 5/2006 | DeBruine |
| 7,047,202 B2 | 5/2006 | Jaipuria et al. |
| 7,047,406 B2 | 5/2006 | Schleicher et al. |
| 7,051,003 B1 | 5/2006 | Kobata et al. |
| 7,054,900 B1 | 5/2006 | Goldston |
| 7,058,606 B2 | 6/2006 | Stefik et al. |
| 7,058,897 B2 | 6/2006 | Matsuda |
| 7,065,579 B2 * | 6/2006 | Traversat et al. ............ 709/230 |
| 7,069,308 B2 | 6/2006 | Abrams |
| 7,103,634 B1 | 9/2006 | Ullmann et al. |
| 7,107,317 B2 | 9/2006 | Demsky et al. |
| 7,120,681 B2 | 10/2006 | Frelechoux et al. |
| 7,150,030 B1 | 12/2006 | Eldering et al. |
| 7,177,929 B2 | 2/2007 | Burbeck et al. |
| 7,251,689 B2 | 7/2007 | Wesley |
| 7,302,429 B1 | 11/2007 | Wanker |
| 7,359,894 B1 | 4/2008 | Liebman et al. |
| 7,370,015 B2 | 5/2008 | Gvily |
| 2001/0007099 A1 | 7/2001 | Rau et al. |
| 2001/0042043 A1 | 11/2001 | Shear et al. |
| 2002/0032634 A1 | 3/2002 | Abrams et al. |
| 2002/0052885 A1 | 5/2002 | Levy |
| 2002/0057284 A1 | 5/2002 | Dalby et al. |
| 2002/0077985 A1 | 6/2002 | Kobata et al. |
| 2002/0078206 A1 | 6/2002 | Boies et al. |
| 2002/0091556 A1 | 7/2002 | Fiala et al. |
| 2002/0091667 A1 | 7/2002 | Jaipuria et al. |
| 2002/0091975 A1 | 7/2002 | Redlich et al. |
| 2002/0116466 A1 | 8/2002 | Trevithick et al. |
| 2002/0124053 A1 | 9/2002 | Adams et al. |
| 2002/0138744 A1 | 9/2002 | Schleicher et al. |
| 2002/0152322 A1 | 10/2002 | Hay |
| 2002/0156875 A1 | 10/2002 | Pabla |
| 2002/0156893 A1 | 10/2002 | Pouyoul et al. |
| 2002/0156917 A1 | 10/2002 | Nye |
| 2002/0169737 A1 | 11/2002 | Armstrong et al. |
| 2002/0178164 A1 | 11/2002 | Wisniewski |
| 2002/0184357 A1 * | 12/2002 | Traversat et al. ............ 709/223 |
| 2003/0002521 A1 | 1/2003 | Traversat et al. |
| 2003/0009423 A1 | 1/2003 | Wang et al. |
| 2003/0014482 A1 | 1/2003 | Toyota et al. |
| 2003/0018582 A1 | 1/2003 | Yaacovi |
| 2003/0018968 A1 | 1/2003 | Avnet |
| 2003/0028596 A1 | 2/2003 | Toyota et al. |
| 2003/0028639 A1 | 2/2003 | Yamamoto et al. |
| 2003/0046587 A1 | 3/2003 | Bheemarasetti et al. |
| 2003/0050976 A1 | 3/2003 | Block et al. |
| 2003/0050977 A1 | 3/2003 | Puthenkulam et al. |
| 2003/0055898 A1 | 3/2003 | Yeager et al. |
| 2003/0061282 A1 | 3/2003 | Ebata et al. |
| 2003/0078858 A1 | 4/2003 | Angelopoulos et al. |
| 2003/0079120 A1 | 4/2003 | Hearn et al. |
| 2003/0084162 A1 | 5/2003 | Johnson et al. |
| 2003/0093520 A1 | 5/2003 | Beesley |
| 2003/0105812 A1 | 6/2003 | Flowers, Jr. et al. |
| 2003/0112823 A1 | 6/2003 | Collins, et al. |
| 2003/0120662 A1 | 6/2003 | Vishik |
| 2003/0120680 A1 | 6/2003 | Agrawal et al. |
| 2003/0135576 A1 | 7/2003 | Bodin |
| 2003/0163597 A1 | 8/2003 | Hellman et al. |
| 2003/0167324 A1 | 9/2003 | Farnham et al. |
| 2003/0171941 A1 | 9/2003 | Kraenzel et al. |
| 2003/0172034 A1 | 9/2003 | Schneck et al. |
| 2003/0179228 A1 | 9/2003 | Schreiber et al. |
| 2003/0191814 A1 | 10/2003 | Tran |
| 2003/0195851 A1 | 10/2003 | Ong |
| 2003/0195924 A1 | 10/2003 | Franke et al. |
| 2003/0204605 A1 | 10/2003 | Hudson et al. |
| 2003/0220975 A1 | 11/2003 | Malik |
| 2003/0220980 A1 | 11/2003 | Crane |
| 2004/0015553 A1 | 1/2004 | Griffin et al. |
| 2004/0024720 A1 | 2/2004 | Fairweather |
| 2004/0024892 A1 | 2/2004 | Creswell et al. |
| 2004/0039913 A1 | 2/2004 | Kruse |
| 2004/0044727 A1 | 3/2004 | Abdelaziz et al. |
| 2004/0044774 A1 | 3/2004 | Mngalik et al. |
| 2004/0054723 A1 | 3/2004 | Dayal et al. |
| 2004/0064416 A1 | 4/2004 | Peled et al. |
| 2004/0064568 A1 | 4/2004 | Arora et al. |
| 2004/0064693 A1 | 4/2004 | Pabla et al. |
| 2004/0073659 A1 | 4/2004 | Rajsic et al. |
| 2004/0081105 A1 | 4/2004 | Shimazaki et al. |
| 2004/0088325 A1 | 5/2004 | Elder et al. |
| 2004/0103044 A1 | 5/2004 | Vandewater et al. |
| 2004/0122822 A1 | 6/2004 | Thompson et al. |
| 2004/0122855 A1 | 6/2004 | Ruvolo et al. |
| 2004/0122958 A1 | 6/2004 | Wardrop |
| 2004/0137882 A1 | 7/2004 | Forsyth |
| 2004/0148275 A1 | 7/2004 | Achlioptas |
| 2004/0148434 A1 | 7/2004 | Matsubara et al. |
| 2004/0148503 A1 | 7/2004 | Sidman |
| 2004/0162871 A1 | 8/2004 | Pabla et al. |
| 2004/0181487 A1 | 9/2004 | Hanson |
| 2004/0193680 A1 | 9/2004 | Gibbs et al. |
| 2004/0205358 A1 | 10/2004 | Erickson |
| 2004/0210535 A1 | 10/2004 | Erickson |
| 2004/0215793 A1 | 10/2004 | Ryan et al. |
| 2004/0220893 A1 | 11/2004 | Spivack et al. |
| 2004/0220957 A1 | 11/2004 | McDonough |
| 2004/0237045 A1 | 11/2004 | Meltzer |
| 2004/0249768 A1 | 12/2004 | Kontio et al. |
| 2004/0260968 A1 | 12/2004 | Edwards et al. |
| 2004/0267625 A1 | 12/2004 | Feng et al. |
| 2005/0013298 A1 | 1/2005 | Srisuresh et al. |
| 2005/0015357 A1 | 1/2005 | Shahidi |
| 2005/0021750 A1 | 1/2005 | Abrams |
| 2005/0031096 A1 | 2/2005 | Postrel |
| 2005/0034107 A1 | 2/2005 | Kendall et al. |
| 2005/0044361 A1 | 2/2005 | Chang et al. |
| 2005/0044411 A1 | 2/2005 | Somin et al. |
| 2005/0091289 A1 | 4/2005 | Shappell et al. |
| 2005/0091316 A1 | 4/2005 | Ponce et al. |

| | | | | | | |
|---|---|---|---|---|---|---|
| 2005/0094313 A1 | 5/2005 | Kim | | 2006/0107286 A1 | 5/2006 | Connor et al. |
| 2005/0097170 A1 | 5/2005 | Zhu et al. | | 2006/0117090 A1 | 6/2006 | Schellingerhout et al. |
| 2005/0114783 A1 | 5/2005 | Szeto | | 2006/0117378 A1 | 6/2006 | Tam et al. |
| 2005/0138430 A1 | 6/2005 | Landsman | | 2006/0121988 A1 | 6/2006 | Reville et al. |
| 2005/0149621 A1 | 7/2005 | Kirkland et al. | | 2006/0123127 A1* | 6/2006 | Littlefield .................. 709/229 |
| 2005/0154701 A1 | 7/2005 | Parunak et al. | | 2006/0136419 A1 | 6/2006 | Brydon et al. |
| 2005/0159970 A1 | 7/2005 | Buyukkokten et al. | | 2006/0136551 A1 | 6/2006 | Amidon et al. |
| 2005/0159998 A1 | 7/2005 | Buyukkokten et al. | | 2006/0143068 A1 | 6/2006 | Calabria |
| 2005/0163135 A1 | 7/2005 | Hopkins | | 2006/0143084 A1 | 6/2006 | Donnelli et al. |
| 2005/0165726 A1 | 7/2005 | Kawell, Jr. et al. | | 2006/0143183 A1 | 6/2006 | Goldberg et al. |
| 2005/0171799 A1 | 8/2005 | Hull et al. | | 2006/0143236 A1 | 6/2006 | Wu |
| 2005/0171832 A1 | 8/2005 | Hull et al. | | 2006/0146765 A1 | 7/2006 | Van De Sluis et al. |
| 2005/0171954 A1 | 8/2005 | Hull et al. | | 2006/0155813 A1 | 7/2006 | Dietz et al. |
| 2005/0171955 A1 | 8/2005 | Hull et al. | | 2006/0167804 A1 | 7/2006 | Aydar et al. |
| 2005/0172001 A1 | 8/2005 | Zaner et al. | | 2006/0167855 A1 | 7/2006 | Ishikawa et al. |
| 2005/0172116 A1 | 8/2005 | Burch et al. | | 2006/0173838 A1 | 8/2006 | Garg et al. |
| 2005/0177385 A1 | 8/2005 | Hull et al. | | 2006/0173957 A1 | 8/2006 | Robinson et al. |
| 2005/0177614 A1 | 8/2005 | Bourne | | 2006/0173963 A1 | 8/2006 | Roseway et al. |
| 2005/0188108 A1 | 8/2005 | Carter et al. | | 2006/0173985 A1 | 8/2006 | Moore |
| 2005/0193054 A1 | 9/2005 | Wilson et al. | | 2006/0184617 A1 | 8/2006 | Nicholas et al. |
| 2005/0197846 A1 | 9/2005 | Pezaris et al. | | 2006/0184997 A1 | 8/2006 | La Rotonda et al. |
| 2005/0198031 A1 | 9/2005 | Pezaris et al. | | 2006/0190536 A1 | 8/2006 | Strong et al. |
| 2005/0198131 A1 | 9/2005 | Appelman et al. | | 2006/0195462 A1 | 8/2006 | Rogers |
| 2005/0198172 A1 | 9/2005 | Appelman et al. | | 2006/0200434 A1 | 9/2006 | Flinn et al. |
| 2005/0198290 A1 | 9/2005 | Berkey et al. | | 2006/0200435 A1 | 9/2006 | Flinn et al. |
| 2005/0198305 A1 | 9/2005 | Pezaris et al. | | 2006/0209727 A1 | 9/2006 | Jennings, III et al. |
| 2005/0201290 A1 | 9/2005 | Vasudev et al. | | 2006/0218153 A1 | 9/2006 | Voon et al. |
| 2005/0203801 A1 | 9/2005 | Morgenstern et al. | | 2006/0218225 A1 | 9/2006 | Hee Voon et al. |
| 2005/0204038 A1 | 9/2005 | Medvinsky et al. | | 2006/0218577 A1 | 9/2006 | Goodman et al. |
| 2005/0210104 A1 | 9/2005 | Torivnen | | 2006/0230061 A1 | 10/2006 | Sample et al. |
| 2005/0210409 A1 | 9/2005 | Jou | | 2006/0248573 A1* | 11/2006 | Pannu et al. .................. 726/1 |
| 2005/0215660 A1 | 9/2005 | Tomikawa et al. | | 2006/0259733 A1 | 11/2006 | Yamazaki et al. |
| 2005/0216300 A1 | 9/2005 | Appelman et al. | | 2006/0272015 A1 | 11/2006 | Frank et al. |
| 2005/0216550 A1 | 9/2005 | Paseman et al. | | | | |
| 2005/0229243 A1 | 10/2005 | Svendsen et al. | | | | |
| 2005/0232423 A1 | 10/2005 | Horvitz et al. | | | | |
| 2005/0234864 A1 | 10/2005 | Shapiro | | | | |
| 2005/0235062 A1 | 10/2005 | Lunt et al. | | | | |
| 2005/0240773 A1 | 10/2005 | Hilbert et al. | | | | |
| 2005/0243736 A1 | 11/2005 | Faloutsos et al. | | | | |
| 2005/0246420 A1 | 11/2005 | Little, II | | | | |
| 2005/0251553 A1 | 11/2005 | Gottfried | | | | |
| 2005/0256866 A1 | 11/2005 | Lu et al. | | | | |
| 2005/0256909 A1 | 11/2005 | Aboulhosn et al. | | | | |
| 2005/0262162 A1 | 11/2005 | Levy | | | | |
| 2005/0262199 A1 | 11/2005 | Chen et al. | | | | |
| 2005/0262530 A1 | 11/2005 | Ruetschi et al. | | | | |
| 2005/0266835 A1 | 12/2005 | Agrawal et al. | | | | |
| 2005/0267766 A1 | 12/2005 | Galbreath et al. | | | | |
| 2005/0267940 A1 | 12/2005 | Galbreath et al. | | | | |
| 2005/0283497 A1 | 12/2005 | Nurminen et al. | | | | |
| 2005/0289648 A1 | 12/2005 | Grobman et al. | | | | |
| 2006/0004789 A1 | 1/2006 | Lunt et al. | | | | |
| 2006/0004892 A1 | 1/2006 | Lunt et al. | | | | |
| 2006/0010225 A1 | 1/2006 | Issa | | | | |
| 2006/0015588 A1 | 1/2006 | Achlioptas et al. | | | | |
| 2006/0020960 A1 | 1/2006 | Relan et al. | | | | |
| 2006/0021009 A1 | 1/2006 | Lunt | | | | |
| 2006/0026235 A1 | 2/2006 | Schwarz et al. | | | | |
| 2006/0031489 A1 | 2/2006 | Marcjan | | | | |
| 2006/0031770 A1 | 2/2006 | McMenamin | | | | |
| 2006/0036641 A1 | 2/2006 | Brydon et al. | | | | |
| 2006/0036766 A1 | 2/2006 | Baupin et al. | | | | |
| 2006/0047839 A1 | 3/2006 | Tate et al. | | | | |
| 2006/0048059 A1 | 3/2006 | Etkin | | | | |
| 2006/0053380 A1 | 3/2006 | Spataro et al. | | | | |
| 2006/0064431 A1 | 3/2006 | Kishore et al. | | | | |
| 2006/0085248 A1 | 4/2006 | Arnett et al. | | | | |
| 2006/0089913 A1 | 4/2006 | Jaipuria et al. | | | | |
| 2006/0090137 A1 | 4/2006 | Cheng et al. | | | | |
| 2006/0095514 A1 | 5/2006 | Wang et al. | | | | |
| 2006/0095792 A1 | 5/2006 | Hurtado et al. | | | | |
| 2006/0095976 A1 | 5/2006 | Torres et al. | | | | |

FOREIGN PATENT DOCUMENTS

| | | |
|---|---|---|
| WO | WO 2005/006152 A2 | 1/2005 |
| WO | 2005111760 A1 | 11/2005 |

OTHER PUBLICATIONS

Unpublished U.S. Appl. No. 11/516,294, filed Sep. 6, 2006.
Unpublished U.S. Appl. No. 11/528,155, filed Sep. 27, 2006.
Unpublished U.S. Appl. No. 11/526,955, filed Sep. 26, 2006.
Unpublished U.S. Appl. No. 11/639,570, filed Dec. 15, 2006.
Unpublished U.S. Appl. No. 11/639,104, filed Dec. 14, 2006.
Dijkstra's algorithm: "is an algorithm that solves the single-source shortest path problem for a directed graph with nonnegative edge weights"—Wikipedia.
Home page for www.myspace.com.
Home page for www.facebook.com.
Home page for www.friendster.com.
Home page for www.foaf-project.org.
Home page for ICQ.com.
Home page for www.huminity.com/English/software.html.
Beverly Yang et al., "Designing a Super-Peer Network," 19th International Conference on Data Engineering (ICDE'03), 2003.
The Case for a Hybrid P2P Search Infrastructure, http://www.cs.berkeley.edu/~boonloo/research/pier/casehybrid_iptps.ppt.
Architecture of Windows Media Rights Manager, www.microsoft.com/windows/windowsmedia/howto/articles/drmarchitecture.aspx.
FOAF Vocabulary Specification, http://xmlns.com/foaf/0.1/.
Deborah L. McGuinness et al., editors; "OWL Web Ontology Language—Overview", copyright 2004 World Wide Web Consortium (W3C), published Feb. 10, 2004, http://www.w3.org/TR/2004/REC-owl-features-20040210/, 19 pages.
Pretschner, Alexander et al., "Ontology Based Personalized Search," Proceedings of the 11th IEEE International Conference on Tools with Artificial Intelligence, p. 391, Nov. 8-10, 1999.
Warren Sack, "Discourse Diagrams: Interface Design for Very Large-Scale Conversations," System Sciences, Proceedings of the 33rd Annual Hawaii International Conference, 2000.
Marc A. Smith and Andrew T. Fiore, "Visualization Components for Persistent Conversations," Sep. 2000.

Srinivasan, T. et al., "OPSHNN: Ontology Based Personalized Searching Using Hierarchical Neural Networks Evidence Combination," The Sixth IEEE International Conference on Computer and Information Technology 2006, pp. 44-44, Sep. 2006.

Dijkstra's algorithm, http://en.wikipedia.org/wiki/Dijkstra's_algorithm.

Welcome to Facebook!, http://www.facebook.com/.

Friendster—Home, http://www.friendster.com.

Huminity—Social Networking, http://www.huminity.com/english/software.html.

ICQ, http://www.icq.com/.

MySpace, http://www.myspace.com.

http://pidgin.im/pidgin/home (redirected from http://gaim.sourceforge.net) (accessed Jul. 13, 2007)—1 page.

U.S. Appl. No. 11/607,775, filed Dec. 1, 2006, Amidon et al., "Systems and Methods for Subdividing and Securing Social Network Circuits".

U.S. Appl. No. 11/638,027, filed Dec. 13, 2006, Amidon et al., "Systems and Methods for Social Network Based Conferencing".

* cited by examiner

SYSTEM AND METHOD OF SHARING CONTENT AMONG MULTIPLE SOCIAL NETWORK NODES USING AN AGGREGATION NODE

FIELD OF THE INVENTION

The present invention generally relates to communication and controlled sharing of digital content among networked users, and is more particularly concerned with aggregating content and/or associated metadata within a pre-existing social network for internal and/or external access via a virtual peer.

BACKGROUND OF THE INVENTION

The increased availability of network-capable computing devices has led to a wide variety of communication options for users. Users can exchange messages and content through various communication systems including e-mail, instant messaging, chat rooms, bulletin and discussion boards, file sharing applications, and blogs and other web sites. For example, instant messaging systems such as Internet Relay-Chat (IRC), ICQ, AOL Instant Messenger, Yahoo! Messenger, and Microsoft's MSN Messenger are widely used by many users on the Internet. Similar systems are available for messaging within local networks, as well.

Various arrangements of the previously-listed (and other) communication systems have been proposed for use in so-called "social networking" systems. Generally speaking, a "social network" refers to a group of persons or other entities ("members") linked to one another through one or more types of social connections. Social networks are also commonly referred to as "friend-of-a-friend" networks, although social networks may of course include or consist entirely of entities linked by social connections other than friendship. For example, a social network can include members linked to one another by connections including common friendship, place or field of employment, place of education, place of residence, membership in a club or other group, or common hobbies or topical interests. Many social networking systems attempt to provide computer-based tools for maintaining, enhancing, and creating social networks.

For example, social networking web sites provide users with web space to create a profile and link to various other users designated as "friends." See, for example, http://www-.myspace.com, http://www.facebook.com, and http://www-.friendster.com. Users of such sites can post messages and other content to web pages accessible to various parties of their choosing (for example, to "friends only" or to the public at large). Social networking sites may also utilize instant messaging and online chat rooms that allow for near-instantaneous communication between users.

Social networks and the interactions thereof may develop from a variety of different systems for establishing, modeling, and/or managing the social network relationships and corresponding infrastructure. In one particular example, social networks can be created for providing "limited viral distribution" of digital content among a plurality of invited users. A content provider may limit the extent to which selected digital content may be shared by establishing a "degree of separation", or maximum level distance from a content provider the content can be distributed through a dynamically created sharing network. In this example, a user wants to seed digital content to a select group of people and allow them to have freedom to spread the content further, at their discretion, and to users of their choice. However, certain controls on the social distribution network are established to prevent the content from going to the general public. The networked relationship that is dynamically created by sharing content from the originating user to other invited members creates a social network for purposes of sharing content in a limited and controlled fashion. Additional details regarding this particular type of social network and associated content sharing features is disclosed in U.S. patent application Ser. No. 11/516,231, entitled "SYSTEM AND METHOD FOR RIGHTS PROPAGATION AND LICENSE MANAGEMENT IN CONJUNCTION WITH DISTRIBUTION OF DIGITAL CONTENT IN A SOCIAL NETWORK", filed on Sep. 6, 2006, currently pending, which is hereby incorporated by reference herein in its entirety for all purposes.

In another specific example of a social network, users create a snapshot of a social network interaction via a social network "circuit". Such social network circuits create unique dynamic social network instances depending on which members in a potential social network are actually participating in some form of actual communication. Additional details regarding this particular type of social network and associated content sharing features is disclosed in U.S. patent application Ser. No. 11/526,955, entitled "SYSTEMS AND METHODS FOR DISCOVERING, CREATING AND MANAGING SOCIAL NETWORK CIRCUITS", filed on Sep. 26, 2006, currently pending, which is hereby incorporated by reference herein in its entirety for all purposes.

Other related known examples of networking tools provide mapping of social networks based on correlating contact lists. For example, tools such as Huminity (http://www.huminity-.com) may "traverse" a social network based on buddy or contact lists and provide a representation of the social network. Unlike the disclosure above regarding creation and management of social network "circuits", these representations are based on static contact lists as opposed to actual live communication among networking members.

Although the above social network instances and content sharing technologies provide valuable features and steps, it may be desirable to adapt such technologies to accommodate still further advancements. For example, it may be desirable to adapt social network instances to provide improved sharing techniques by way of integrated peer-to-peer (P2P) content sharing. More particularly, improved sharing networks are needed for relaying data among linked nodal members of a social network. Although various social networking technologies exist, no solution that addresses all the features and aspects of the present subject matter has been developed.

BRIEF SUMMARY OF THE INVENTION

Objects and advantages of the invention will be set forth in part in the following description, or may be obvious from the description, or may be learned through practice of the invention.

One aspect of the present subject matter concerns features by which a hybrid peer-to-peer (P2P) network is used for sharing content in a pre-existing social network. Exemplary pre-existing or dynamically created social network technologies include Friend-Of-A-Friend (FOAF) social networks for controlled viral content distribution, social network circuit instances for defining live communication links among networked users, and social networks formed by any other suitable network-based communication technology, including e-mail, instant messaging, web-based communications, file and content sharing, audio communications including cellular and VoIP telephony, and the like. Members of a pre-existing social network may selectively choose to form an additional content sharing network and can turn their preexisting network into a virtual peer which may then be accessible as a single node from outside the new content-sharing network.

In one particular embodiment related to such exemplary aspect, a method of sharing content among multiple network nodes in a pre-existing social network includes an initial step of forming a virtual peer. This process may include a first step of providing each network node with an embedded peer. A first network node then decides to establish a virtual peer for sharing content and activates a latent (or dormant) peer associated with such first network node. The first network node is then communicatively connected to an aggregation node, such as a proxy, supernode, central server or the like. A unique identifier is then established by either the first network node or the aggregation node and provides an identifier that enables other nodes in the network to identify the virtual peer and also join. The unique identifier also enables other nodes external to the network to view the virtual peer as a single node in the P2P content sharing network. The aggregation node also functions as a communication end-point for the virtual peer, thus making it possible for multiple social network nodes communicatively connected to the aggregation node to be addressed with a single request in a manner that is transparent to the participating network nodes.

With further reference to the above exemplary content sharing methodology, the virtual peer construct formed by at least one aggregation node and other participating network nodes may facilitate additional content sharing functionality. In some embodiments, digital assets are is distributed in a controlled fashion among network node members of the virtual peer by using FOAF level rights defined by an originating node who is the source of the assets. The actual level distance between an originating node and recipient nodes in the network may be calculated by the aggregation node. Additional embodiments use the virtual peer construct to provide playlists to be played on selected network nodes. Content on the created playlists may be organized based on a receiving node's position relative to other nodes in the virtual peer. Still further embodiments employ user interfaces for viewing the playlists or shared digital content. Play list content may be arranged by distance from a current node, node weight, and other factors. In some embodiments, participating nodes may be limited in their ability to view and/or access shared content depending on their level in the social network.

In more particular exemplary embodiments, the visual information provided by the user interface includes a first list of content that is shared by the given client and a second list including content that is shared by other content sharing nodes in the network. The display lists may be limited to display content received from other sharing nodes in the network up to a maximum degree of separation from the client. The lists may correspond to playlists, with content organized in a sequential order based on such criteria as the level number of the sharing node from which each piece of content is received or the level of interconnection of each sharing node from which each piece of content is received. A list of nodes which are linked to share content in the network may also be provided.

Another exemplary embodiment of the present subject matter concerns the structure of a client configured to communicate with other nodes in the social network that are linked together and represented as a virtual peer. The content sharing nodes in such an arrangement include the client and at least one other content sharing node which respectively have an embedded peer for establishing an activated direct or indirect connection to an aggregation node (e.g., a proxy, central server, supernode or the like). When the peers associated with each content sharing node are activated and connected to the aggregation node, the aggregation node is configured for collecting digital content and/or metadata about such content from such nodes. A user interface associated with the client may then provide visual information to a client user, including a list of digital content that is shared among the content sharing nodes in the social network.

In accordance with another aspect of the present technology, the aggregation node in the P2P system is used to distribute shared content using FOAF level-rights which specify a user's access rights to shared content based on their level or "degree of separation" from an originating node. The proxy is configured to calculate the level distance between any two sharing nodes in a social network. In one embodiment, a proxy or supernode aggregates content and issues level-rights or content modified in accordance with such level-rights based on the level distance among sharing nodes in a social network. This determination of level distance by a centralized aggregation node differs from alternative configurations where level distance is established based on what user a given node receives an invitation from to view content or join the social network.

In other embodiments, the proxy may also be used to create and distribute play lists across the P2P network members. The play lists may be different for every node that is linked to the proxy.

Other features and aspects of the present invention are discussed in greater detail below.

BRIEF DESCRIPTION OF THE SEVERAL VIEWS OF THE DRAWINGS

The foregoing and other features, aspects and advantages of the present invention will become better understood with regard to the following description, appended claims and accompanying drawings where:

Use of like reference numerals in different features is intended to illustrate like or analogous components.

DETAILED DESCRIPTION OF THE PREFERRED EMBODIMENTS

The invention will now be described in detail with reference to particular embodiments thereof. The embodiments are provided by way of explanation of the invention, and are not meant as a limitation of the invention. It will be apparent to those skilled in the art that various modifications and variations can be made in the present invention without departing from the scope and spirit of the invention. For example, features described or illustrated as part of one embodiment may be used with another embodiment to yield a still further embodiment. Thus, it is intended that the present invention include these and other modifications and variations as come within the scope and spirit of the invention, including the appended claims and their equivalents.

The technology discussed herein makes reference to servers, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer.

The present disclosure also makes reference to the relay of communicated data over a network such as the Internet. It should be appreciated that such network communications may also occur over alternative networks such as a dial-in network, a local area network (LAN), wide area network (WAN), public switched telephone network (PSTN), the Internet, intranet or Ethernet type networks and others over any combination of hard-wired or wireless communication links.

The various computer systems discussed herein are not limited to any particular hardware architecture or configuration. Any suitable programming, scripting, or other type of language or combinations of languages may be used to implement the teachings contained herein.

The present disclosure provides several instances of communication systems that include social network circuit functionality. For purposes of example only, the present disclosure uses several examples involving instances of dynamically created social networks configured for limited distribution of digital content as well as social network circuit instances involving instant messaging (IM) or other communication systems. However, one of ordinary skill in the art will understand that the principles and teachings contained herein are applicable not only to the social network instances disclosed, but to other social network communication instances, such as those occurring via any other suitable network-based communication technology, including e-mail, instant messaging, web-based communications, file and content sharing, audio communications including cellular and VoIP telephony, and/or the like.

Figure 1:
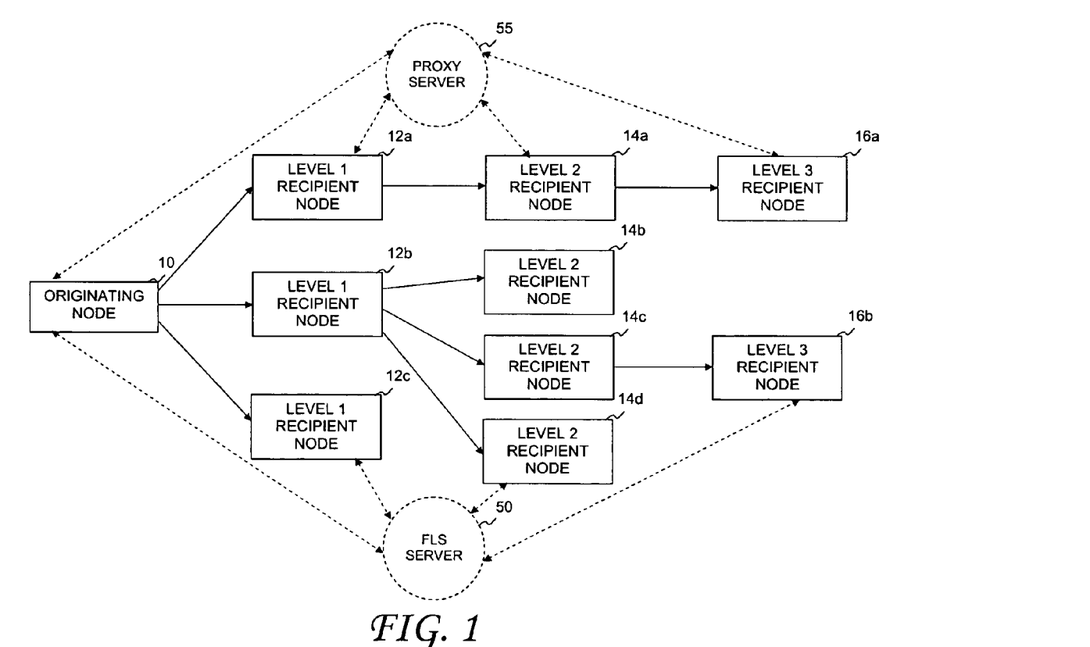
FIG. 1 provides a block diagram representation of an exemplary network interaction among multiple clients, a license server and a proxy server in a social network.

With more particular reference to a first example of a social network with which the features and steps of the presently disclosed technology may be integrated, FIG. 1 illustrates an exemplary social network of users sharing digital content in accordance with certain controls on distribution. Users are designated generally in FIG. 1 as nodes, although it should be appreciated that more specific representations such as clients, peers, or the like may be employed in other embodiments. An originating node 10 identifies digital content that is to be shared with other nodes in a network. It should be appreciated that users of the disclosed technology, including originating node 10 as well as recipient nodes may correspond to individuals, groups of individuals, business entities, etc. and should not be a limiting feature of the present subject matter. In one example, originating and recipient nodes may be embodied by such physical systems as a personal computer (PC), mobile terminal device (e.g., cellular telephone), Personal Digital Assistant, or the like.

Before an originating node actually distributes digital content, certain distribution parameters that establish limitations on how the digital content is to be distributed to one or more recipient nodes must be selected. Distribution parameters can include such information as a level limit representative of the maximum number of "degrees of separation" allowed between the originating node and any recipient node. In the example of FIG. 1, originating node 10 designates a level limit of three levels, which means that the selected digital content can only be distributed up to a maximum of three levels away from the originating node 10.

Distribution parameters can also include an initial distribution list that designates the starting nodes for the dynamically created social network. In the example of FIG. 1, originating node 10 selects three users in an initial distribution list, corresponding to level one (1) nodes 12a, 12b and 12c. Level one recipients 12a, 12b and 12c are then free to distribute to any entity they wish that is not specifically blocked by the originating node. For example, in accordance with a second level of content distribution as illustrated in FIG. 1, level one recipient 12a may choose to send the selected digital content to level two (2) recipient 14a, while level one recipient 12b may choose to send the digital content to multiple nodes 14b, 14c and 14d and level two recipient 12c does not further distribute the content. In accordance with a third level of content distribution, node 14a decides to forward the digital content to level three (3) recipient 16a, node 14c shares the digital content with level three recipient 16b, and peers 14b and 14d do not share the content with further nodes. Level three recipients 16a and 16b are restricted in this particular example from further distributing the selected digital content since originating node 10 defined a distribution level limit of three.

As observed from the layered communication among networked users depicted in FIG. 1, the entire spectrum of distribution is not defined by the originating node. Instead, the subject content distribution network involves dynamic (or viral) distribution as opposed to a predetermined configuration. Originating node 10 doesn't know if the selected digital content will reach three or three-hundred people, but it will not be distributed beyond three levels deep in the dynamically created social network. It should be appreciated that the content distribution depicted in FIG. 1 is for exemplary purposes only and many variations are possible in accordance with the disclosed technology. More particularly, each node in a given level n may decide to share with a lesser or greater number of nodes in the next level n+1 than is actually illustrated in FIG. 1.

Additional distribution parameters that are specified by originating node 10 include alteration definitions for one or more of the three allowable levels in the social network. Alteration definitions may define degradation characteristics for the digital content, such as a number of frames per second, file resolution, file size, length, color or bit rate, or other file characterization parameters as will be known or appreciated by one of ordinary skill in the art. Alteration definitions may also define an augmentation file, such as but not limited to a visible or invisible watermark or other hindrance, an advertisement, a portion of text, or a supplemental audio or video segment for appending, prepending or otherwise incorporating into the digital content. Another parameter may correspond to a maximum number of total recipient nodes for overall distribution or for maximum distribution per level. A still further distribution parameter may include one or more relationship types for identifying desirable characteristics or limitations associated with recipient nodes authorized to receive versions of the digital content. In one example, originating node 10 may select a digital video for controlled distribution to recipient nodes and may wish to degrade the quality level of the video as it spreads farther away from the originating node. In one example, level-one nodes 12*a*, 12*b* and 12*c* receive a highest quality video from originating node 10. Level-two recipient nodes 14*a*, 14*b*, 14*c* and 14*d* receive a medium quality version of video, and level-three nodes 16*a* and 16*b* receive a version that is low quality and has advertisements preceding the video playback.

Before originating node 10 is able to share digital content to other nodes in the network of FIG. 1, a desktop application provided on the originating node's computing system generates certain information, including a key ID, which corresponds to a unique identifier for the selected digital content and also a license key seed (LKS). The LKS is a value that is only known by the originating node 10 and a FOAF license server (FLS) 50, and is used to encrypt the digital content. A distribution package including all such information ultimately contains a form of the digital content that has been encrypted and locked with a license "key". The result is an encrypted file that can only be unlocked by a person who has obtained a license with the required key for decrypting the digital content. Such a license may be received by a recipient node from FLS 50.

In one embodiment of content sharing as effected by the dynamically created social network of FIG. 1, FLS server 50 is a stand-alone centrally hosted license server (without the involvement of a proxy server 55) that is accessible from the systems of an originating node and recipient nodes. It should be appreciated that although FLS 50 (and proxy server 55) are only depicted in FIG. 1 as being in bi-directional communication via dashed lines with a closest subset of network nodes, such communication is actually provided for each node in the network when those respective servers are utilized. The limited depiction is merely provided for ease of illustration.

When FLS 50 functions as a stand-alone license server without the use of a proxy server 55, FLS 50 is responsible for issuing licenses for each level of recipient nodes in the social network, while the nodes in the peer-to-peer network are responsible for content propagation. In accordance with the DRM model of FIG. 1, originating node 10 only shares a content license key with FLS 50, so that FLS 50 can issue licenses. For security reasons, such key is not shared with recipient nodes 12*a*-12*c*, 14*a*-14*d*, and 16*a*-16*b*, or other nodes when available. FLS 50 includes in part a license assignment module that creates licenses for received content in response to an access request from a recipient node. Licenses are created according to the level-rights and distribution parameters defined for the particular node levels associated with the given digital content. A license generated by FLS 50 includes a key that can be used to unlock, or decrypt the content that was previously encrypted by a user's content distribution desktop application. In one embodiment, recipient nodes 12*a*-12*c*, 14*a*-14*d*, 16*a*-16*b*, etc. cannot modify the digital content before forwarding the content downstream to the next level of user(s), if allowed.

In another distribution scenario related to the social network of FIG. 1, an arrangement utilizing a proxy server and hybrid P2P model provides additional efficiencies. When a social network employs FLS server 50 and a proxy server 55 in combination, all previously intra-node communications can flow through proxy server 55. Proxy server 55 brings a capability to manage DRM and content propagation transparently on behalf of originating node 10. Proxy 55 also offloads DRM management by taking over DRM functions on behalf of the originating node automatically as content is introduced into the network. In accordance with the technology disclosed herein, a complete and lossless form of digital content is no longer required to be passed to each recipient node in the social network. In contrast, only the form of digital content that each recipient node is authorized to view is ultimately passed to each requesting recipient peer. In addition, any augmented files which are designated by the originating node for appending, prepending or otherwise integrating with a form of the digital content do not need to be stored at each level in the network. Instead, the video advertisement, graphic or text, or other augmentation file can be extracted from the Internet or fetched from originating node 10 by the proxy server 55 (or other designated generation peer) during a step of generating a rights-managed form of the digital content. By utilizing references and loading the content only when needed, the file size of shared content can be reduced.

Additional description regarding aspects of controlled content distribution as implemented in a social network such as briefly discussed above with reference to FIG. 1 are disclosed in the following currently pending patent applications, co-owned by Qurio Holdings, Inc., which are incorporated by reference in their entirety for all purposes: U.S. patent application Ser. No. 11/516,294 entitled "System and Method for Controlled Viral Distribution of Digital Content in a Social Network", filed Sep. 6, 2006 and U.S. patent application Ser. No. 11/528,155 entitled "System and Method of Using a Proxy Server to Manage Lazy Content Distribution in a Social Network", filed Sep. 27, 2006.

Figure 2:
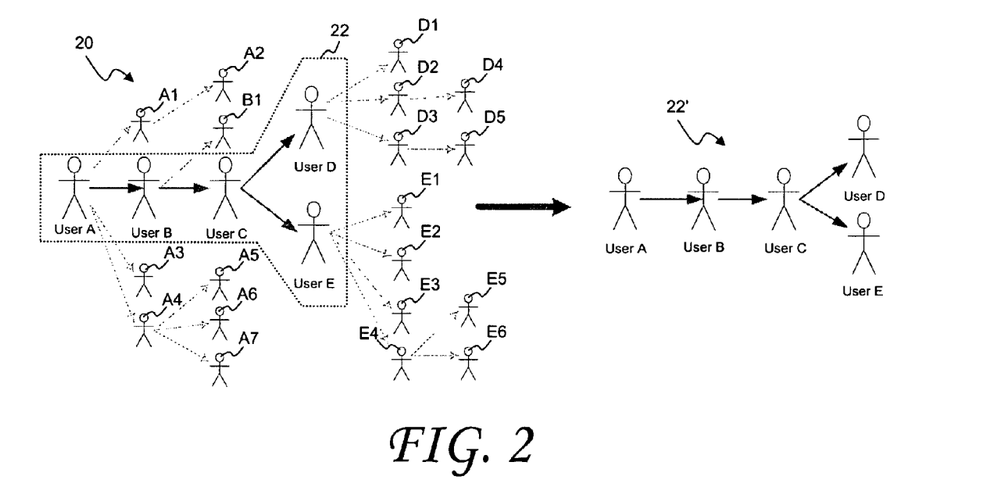
FIG. 2 provides an interconnection schematic diagram of an exemplary social network, including an exemplary social network circuit portion thereof.

Another example of a social network environment in which features of the presently disclosed technology may be implemented will now be discussed with reference to FIGS. 2 and 3. FIG. 2 illustrates an exemplary static social network 20 as shown from the point of view of "User A." Although the figures provided herein use a diagram form, it will be appreciated that social networks may be illustrated in many different ways. For example, a social network can be visualized as a circle, a tree or graph, a diagram, a node map with expandable/collapsible nodes, a table, etc.

One of skill in the art will note that User A's social network includes a plurality of members separated by varying degrees of separation from A. In this example, User B is separated from User A by a single degree of separation, User C is two degrees of separation from User A, and so on. Users D4, D5, E5, and E6 are the farthest-separated members of this particular social network, in this case being separated from User A by five degrees of separation.

As is also known to one of skill in the art, a social network such as social network 20 may be generated based on ascertaining a variety of links between the members. For example, social network 20 may be generated through lists of friends or contacts, such as would be provided to a social networking site. Network 20 may represent the end result of correlating e-mail or other contact information, such as a buddy or contact list in an instant messaging application. For example, users A1, B, A3, and A4 may all be linked to user A on the basis of being entries in A's address book. Alternatively, Users A1, B, A3, and A4 may be on a buddy or contact list in an instant messaging application utilized by A. Continuing with the latter example, Users A5, A6, and A7 may be on User A4's buddy list, and so forth. One of skill in the art will recognize that the social network 20 may be generated based on a variety of different sources taken alone or in combination; for instance, some of the links between the users depicted in network 20 may be based on address book entries, other links based on buddy lists, and still further links based on friend preferences provided by the users. Systems and methods for administering and using social network circuits as described herein may rely on any number and combination of underlying social networks. Data defining the underlying social network(s) may include data obtained from other, pre-existing social network representations. Alternatively or additionally, the underlying social network(s) may be defined from social network representations generated specifically as a basis for social network circuit participation.

As noted previously, however, a map, diagram or other representation of a static social network may be of limited use to User A. For instance, although A may be able to determine whether certain members in one or more social networks are online, A has no easy way of determining who is in actual communication with one another, the extent of such communication, or desired topics of communication.

Embodiments of the presently-disclosed systems and methods may be of value to users such as A. FIG. 2 illustrates social network 20 with an exemplary overlay depicting a social network circuit 22 that may be ascertained by use of the technology disclosed in currently pending co-owned U.S. patent application Ser. No. 11/526,955 entitled "Systems and Methods for Discovering, Creating and Managing Social Network Circuits", filed on Sep. 26, 2006 and incorporated by reference herein in its entirety for all purposes. Briefly, exemplary social network circuit 22 includes Users A, B, C, D, and E, and is tracked using one or more computing devices that receive session information identifying live communication links between the users in the circuit. Social network circuits such as 22 may be presented to one or more users in the circuit to assist the user(s) and enhance the overall online experience and communication capabilities of the user(s). The portion of a static social network (e.g., 20) that includes an identified social network circuit instance (e.g., 22) may be represented in isolation from the static network as shown by circuit instance 22' of FIG. 2. Other graphical representations besides a schematic user map as shown in FIG. 2 may also be employed to depict the linked members of a social network in actual live communication with one another.

Social network circuits as briefly described above may be used by members thereof for a variety of different communication purposes, including content distribution, collaboration, gaming, messaging, and topic-based discussions. Social network circuits may be administered and used through use of a plurality of computing devices linked by network connections. As was noted above, any type or combination of types of network connections are suitable.

Figure 3:
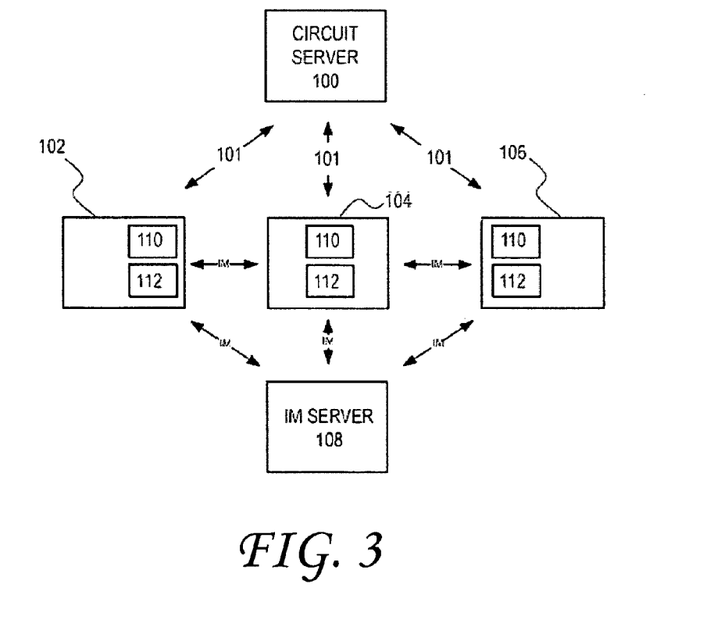
FIG. 3 provides a block diagram of exemplary hardware and software components and interaction for use with social network circuits such as that illustrated in FIG. 2.

FIG. 3 depicts a block diagram configuration of an exemplary social network circuit system as implemented alongside an instant messaging (IM) network. In FIG. 3, a social network circuit server 100 is shown in communication with a plurality of clients 102, 104, and 106, where each client may correspond to a different one of communicating users A-E as represented in FIG. 2. One of skill in the art will appreciate that embodiments of the technology disclosed herein could include more or fewer clients than the three illustrated in this particular example. Each client may comprise, for example, a user computing device such as a personal computer (PC), cellular telephone, or network-capable personal digital assistant (PDA). Each client 102, 104, and 106 includes processing capability and has access to one or more forms of computer-readable storage. Each client 102, 104, and 106 is configured to use such processing capability and memory access to load and execute software including two software applications 110 and 112.

Software application 110 comprises a social network circuit client application, while software application 112 represents one or more communication applications. In this example, software application 112 is configured to send and receive instant messages between and among the clients, and in this example is further configured to interface with an IM server 108. For example, application 112 may comprise an IM application such as AOL Instant Messenger or Yahoo! Messenger.

Software application 110 is configured to provide social network circuit functionality to each client by interfacing with one or more social network servers such as social network server 100. Each instance of application 110 is configured to provide session data to server 100, the session data including information identifying one or more live communication links between the client and one or more other clients. For example, application 110 may monitor communications activities of one or more communications applications 112 and generate session data therefrom. Additionally or alternatively, application 110 may generate session data by monitoring other activities of the client, for example, by monitoring operating system activities, other applications, or network connections. Application 110 may also be further configured to provide the client with one or more depictions of active and potential social network circuits based on data received from server 100.

Server 100 is configured to receive session information from the clients 102, 104, and 106. Server 100 may be programmed to continuously track one or more social network circuits by determining which members of a social network are connected by live communication links based on session data received from the client applications 110. The server may maintain a record of all active, potential, and past social network circuits through use of one or more databases, and may further maintain records of user preferences and other configuration settings.

For example, when one client establishes a communication link to one or more other clients, at least one of the involved clients sends a message to server 100 including session information. For instance, the client application 110 may be configured so that session information is sent to server 100 after the client initiates communication with another client and receives some sort of positive response. The server 100 can store information identifying the session. When queried as to possible circuits involving a client, the server may build an n-level diagram based on live sessions. N may be a limit specified by the querying client. The server may be further configured to observe an upper limit to n based on resource considerations.

Although depicted as a single server in FIG. 3, the social network circuit server 100 may be implemented as more physical or logical units. For example, the functionality provided by server 100 may be distributed across a plurality of networked servers or even to supernodes within the social network. Social network server 100 may be implemented as a modular component or process in a larger system, for example, as a component in an instant messaging system or social network site. Application 110 may be configured to contact server 100 on a continuous or intermittent basis and may provide session data including more detail than simply identification of communication links. For example, session data can include updates as to progress and status of previously-identified communication links. Similarly, social network circuit server 100 may be configured to track social network circuits continuously, in real-time or near-real-time, or at regular or irregular intervals. In some embodiments, social network circuit server 100 may be configured to actively query client applications for session and other data.

The system may be configured so that an active social network circuit is not created until one or more users explicitly request creation of a circuit. Alternatively, the system may be configured to automatically create active circuits based on one or more parameters.

In the example of FIG. 3, application 110 comprises a plug-in to the instant messaging application. One of skill in the art will appreciate, however, that application 110 may be implemented as a standalone program with communications capability. In such an example, no separate communication application 112 or related server 108 would be used. Furthermore, depending upon the particular communications context, communication application 112 may connect to more or fewer servers. For example, assuming communication application 112 comprises a peer-to-peer content sharing application, no connection to a central communication server 108 is necessary. However, if one or more central communication servers such as server 108 are utilized by application 112, such server(s) may be utilized by social network circuit server 100 as a source of session data.

One of skill in the art will appreciate that application 110 need not be limited to tracking communications links between a user via a single application or medium. Instead, the system may be configured to monitor address situations in which a particular social network member may be connected to several members of a social network by disparate means.

For example, a multi-tasking user M may be linked to one member of a social network by an instant messaging connection while engaging in file-sharing with a second member of the social network. Application 110 may be configured to provide session information about both connections to server 100. Taking the example further, the user may be further connected to a third member of the social network by a VoIP telephone link, with the link also monitored by application 110.

Multiple instances of application 110 may correspond to the same user. Taking the example of multi-tasking user M, assume that, rather than using a VoIP telephone link, M is in contact with the third member of the social network by a cellular telephone link. In that case, one or more instances of application 110 would provide session data regarding the instant messaging and file-sharing links while a separate instance of application 110 associated with the cellular connection (such as running on the cellular telephone or at the cellular telephone provider) would provide session data regarding the cellular connection.

Now that examples of social network instances have been described, discussion of supplemental features that may be incorporated with such social network technologies will now be discussed. A description of how content sharing in a social network may be adapted for use with an ad hoc virtual peer will be discussed with reference to FIGS. 4-7, respectively.

Figure 4:
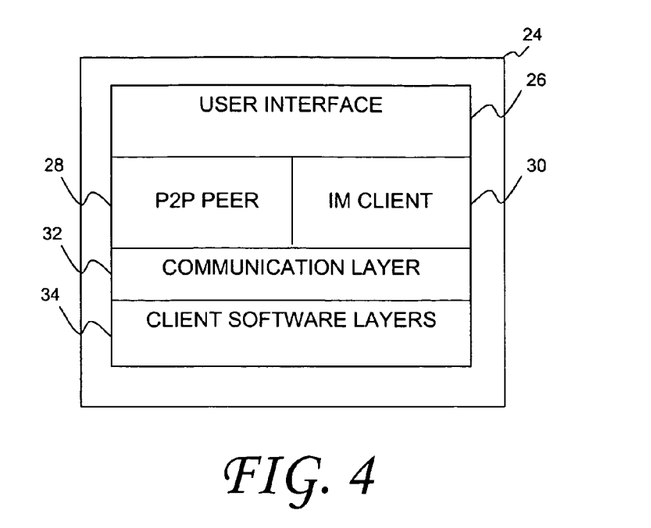
FIG. 4 provides a block diagram of exemplary functional components within a client communicating in a social network instance capable of establishing a virtual peer for sharing content.

FIG. 4 depicts an exemplary client configuration 24 for use in client systems, such as may be utilized at the originating or recipient nodes of FIG. 1 or the clients of FIG. 3 (corresponding to Users A, B, C, etc. in the social network of FIG. 2). In the exemplary embodiment of FIG. 4, client 24 includes a user interface 26 for reviewing communication status, shared content and other related parameters associated with the communication among social network nodes. In one example, user interface 26 may be a graphic or video display such as provided via computer monitor, cellular device LCD display, etc., an audio implementation providing description of information, a print-out or other means for communicating information to a user. Client 24 also includes a peer-to-peer (P2P) peer 28 and instant messaging (IM) client 30 (or client for other types of networked communication other than IM). Peer 28 and IM client 30 are depicted as working side-by-side in the social network client 24 in FIG. 4. It should be appreciated that such components may alternatively be represented as a client 30 operating with an embedded peer 28 as illustrated in the network of FIG. 5.

Referring still to FIG. 4, client 24 may include at least one communication layer 32 for buffering or otherwise handling the actual relay of communicated data as it is sent or received over a network. Communication layer 32 may correspond in one embodiment to the communications application 110 previously discussed with reference to FIG. 3. Client software layers 34 may handle a variety of other functions, such as but not limited to the functions performed by software application 112 described above with reference to FIG. 3. It should be further appreciated that a client 24 may also include still further hardware and/or software components not illustrated in FIG. 4, such as but not limited to one or more processors, input/output peripheral devices, memory components, etc. Since the utilization of such components are readily known and appreciated by those of ordinary skill in the art, no additional discussion of such components or others will now be presented.

Figure 5:
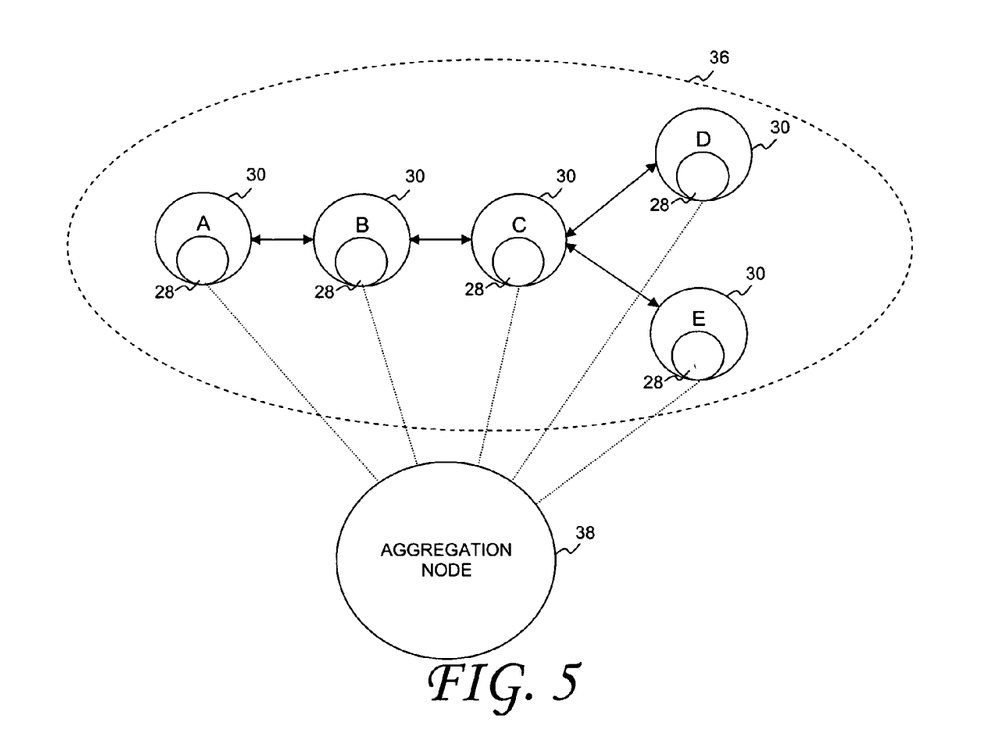
FIG. 5 provides a block diagram representation of exemplary network interaction in a social network circuit, such as that of FIG. 2, linked to an aggregation node for establishing a virtual peer configuration.

Referring now to FIG. 5, clients A, B, C, D and E are intended to correlate with exemplary social network circuit members as previously described with reference to FIG. 2. Users A-E are part of a pre-established social network circuit 36, in which each of the nodes is already communicating with other nodes via the network infrastructure provided by the circuit. In the example of an IM network, such users A-E may be communicating via a pre-determined IM program such as one provided by Yahoo, AOL, Google, Jabber, or others known or developed in the art for networked IM communications. As previously discussed, although the example of an IM social network circuit is used in FIG. 5, an FOAF social network for implementing controlled content distribution as discussed relative to FIG. 1, a chat room, an e-mail list or other types of social network interactions may also form the basic social network members that are linked to form social network 36.

Referring still to FIG. 5, each user's client contains an IM client 30 and an embedded peer 28. The members of social network 36 may selectively decide in whole or in part to form an additional content sharing network, at which time latent peers 28 become active and are communicatively coupled to aggregation node 38 as part of the process of forming a virtual peer. A virtual peer is a logical construct enabling a number of virtual peer members to appear as a single node in the P2P content sharing system. In operation, the aggregation node 38 helps create the virtual peer by coordinating identification and invitation among members in a social network instance. After at least one network node joins the virtual peer, a unique identifier is assigned to the virtual peer so it can be registered and identified by other nodes in the network. Once registered, the aggregation node operates as the communication endpoint for the virtual peer and multiple participating network nodes can be addressed with a single request to the virtual peer address. In one embodiment, each user is unaware that the P2P peer 28 is being used to share content with the social network 36. Peers 28 may be dormant, and only become active when content sharing among the social network 36 is enabled. In another embodiment, each peer 28 is active for personal sharing, but is not part of the virtual peer until directed to do so by the user.

With further reference to FIG. 5, it should be appreciated that aggregation node 38 may correspond to a number of different components. In one embodiment, aggregation node 38 may comprise a centralized server and/or a proxy server. Although the aggregation node 38 could be provided as one or more separate communication nodes with distinct functionality in one embodiment, other embodiments may integrate the same or similar functionality as the centralized FLS server 50 of FIG. 1, operating alone or in combination with a proxy server such as 55 in FIG. 1 such that aggregation node 38 performs the functionality described herein as well as selective functions of the license server 50 and/or proxy server 55 of FIG. 1. In still further embodiments, aggregation node 38 may be represented as a supernode.

In general, peers 28 participating in the social network 36 may be connected to aggregation node 38 by any type of local or network connection. For example, the peers 28 may be connected to the aggregation node 38 via a direct communication link such as a wired connection or a local wireless connection. A local wireless connection may be, for example, a connection according to one of the suite of IEEE 802.11 standards, the Bluetooth standard, or the like. Alternatively, the peers 28 may be connected to the aggregation node 38 directly or indirectly via one or more nodes in the social network 36 or other content sharing network. As another alternative, the peers 28 may be connected to the aggregation node 38 over the Internet, a Wide Area Network (WAN), a Local Area network (LAN), a cellular network, or any combination thereof using a connection oriented protocol such as Transmission Control Protocol (TCP) or a connectionless protocol such as User Datagram Protocol (UDP). Further multiple connections may be used between each peer 28 and the aggregation node.

To provide efficient content sharing and additional functions as described herein, including but not limited to forming and playing content playlists and distributing digital content within a social network in a controlled fashion, aggregation node 38 operates to obtain selected digital content and/or metadata describing all or a portion of a number of different content pieces shared by the participating nodes. The aggregation node 38 combines (or aggregates) the metadata and/or content into a single collection of data, which may be referred to as a metadata catalog, for the virtual peer. Thereafter, the aggregation node 38 may serve content discovery requests from participating nodes or nodes external to the virtual peer or the social network by using the metadata catalog. When aggregation node 38 aggregates content as opposed to just content metadata, aggregation node 38 may selectively cache all or a portion of the content shared by the participating peers in order to efficiently serve content requests. In some embodiments, a metadata catalog may maintain multiple references for the same content where the content is hosted by multiple participating peers.

The digital content available at each participating peer may include, for example, images, videos, hypertext transfer markup language (HTML) code, documents, presentations, spreadsheets, graphics, audio, or the like. Metadata associated with each piece of content generally includes information describing the content and optionally the participating peer who is sharing the content. In one embodiment, such metadata may be considered distinctly separate from its corresponding digital content, but some digital content file types enable metadata to be stored within the content file. For example, the Joint Photographic Experts Group (JPEG) file format enables metadata such as keywords, annotations, resolution, size, camera settings, information describing the camera that captured the image, date and time of capture, location such as Global Positioning System (GPS) coordinates, and the like to be stored within the image file. The metadata may also include information describing the participating network node hosting the particular form of content. For example, if the participating node is a mobile telephone, the metadata may optionally include the make and model of the mobile telephone; hardware and software capabilities of the mobile telephone such as processor, storage, and memory capabilities; and the like.

Additional details regarding collecting multiple nodes together as a virtual peer are disclosed in co-owned and currently pending U.S. patent application Ser. No. 11/536,888 entitled "Virtual Peer for a Content Sharing System", which was filed on Sep. 29, 2006 and which is incorporated by reference herein in its entirety for all purposes. The aggregation node 38 may be configured in one exemplary embodiment to perform selected functions of the sponsoring node/agent in the above application, especially with regard to the process of registering a virtual peer in a P2P content sharing network FIG. 6 discloses exemplary steps by which networked clients and an aggregation node form a hybrid P2P network for content sharing as a virtual peer. In accordance with such a method of content aggregation and sharing, the network is accessible as an established virtual peer, which means that the content shared among the network nodes is aggregated into one virtual peer that is addressable or accessible from all the internal nodes of the social network 36 (e.g., users A-E in FIG. 5). Further, the virtual peer may be optionally accessible from external nodes as a single entity.

Figure 6:
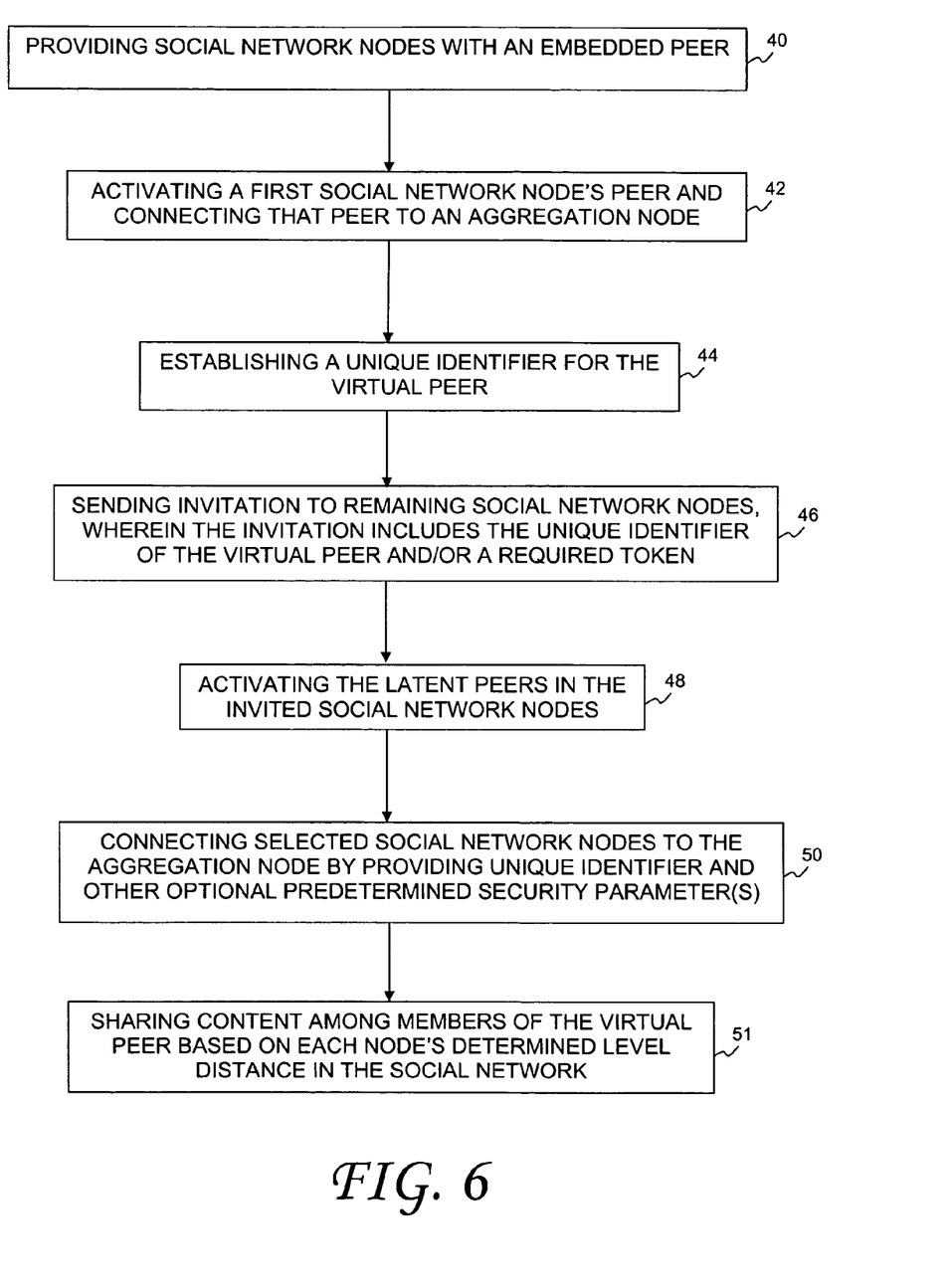
FIG. 6 provides a flow chart of exemplary steps in a method for aggregating content from multiple network nodes in a pre-existing social network into a virtual peer.

Referring more particularly to FIG. 6, a first exemplary step 40 in a method of aggregating content from multiple clients into a networked virtual peer arrangement comprises providing each network node with an embedded peer. An exemplary peer may correspond to one of the latent P2P peers 28 illustrated and discussed with reference to FIGS. 4 and 5. A first node owner then decides to establish a sharing network, at which point that owner's peer becomes active and connects to the aggregation node in step 42. The aggregation node to which the first node owner and others connect operates as a data communication hub for shared content and may be configured with certain content delivery rules as will be discussed later in further detail.

After at least one network node is connected to the aggregation node, a unique identifier for the virtual peer is established in step 44. In one embodiment, the first node owner to establish the sharing network passes to the aggregation node an ID for the network that will be the name for the virtual peer. In one embodiment, the virtual peer identifier consists of any unique and memorable moniker chosen by the first node owner, such as "Richard's Posse" or "Mike's Work Group", etc. Other unique identifiers such as but not limited to an e-mail address, an IM username or address, an Internet Protocol (IP) address, a Uniform Resource Identifier (URI) including Uniform Resource Locators (URLs) or others, a Media Access Control (MAC) identifier and/or any other suitable type of parameter for identifying the virtual peer may be utilized. In another embodiment, the aggregation node establishes the unique identifier for the virtual peer. The aggregation node may maintain name space in an internal or linked external database for all the virtual peers in a social network. The aggregation node may be configured to reject proposed identifiers if they are already taken at that time and/or a previous time. The aggregation node may then suggest an alternative identifier for the virtual peer or simply request that the first node owner select an alternative identifier. In a still further embodiment, the first node owner may serve as the aggregation node for the virtual peer, and other network nodes connect to the first node owner. In such instance, a name space server (not illustrated) may be provided separate from the first node owner in order to maintain a consistent name space for virtual peers in this and other related scenarios.

The virtual peer identifier established in step 44 will typically be used for identification purposes within the members of the social network instance who connect to the sharing network, and may also be accessible in some embodiments by non-member peers. The identifier for each virtual peer may be listed in a directory for discovery by other nodes or web users. There may also be a meta-directory about virtual peers that is searchable by member and/or non-member peers. Member and non-member peers use the virtual peer identifier to join to the established sharing network, as will now be discussed in greater detail.

Referring still to FIG. 6, additional steps 46-50 involve selectively connecting the peers of remaining nodes in the social network to the aggregation node. More particularly, in exemplary step 46, invitations are sent out over the social network to all remaining nodes in the given social network instance. Each invitation may include the name of the virtual peer as uniquely identified in step 44 so that the invited nodes can pass the identifier back to the aggregation node for verification purposes if such nodes decide to join the content sharing network as indicated in step 50. Before the step related to the actual connection of invited nodes to the aggregation node in step 50, the peers in each selected of the invited nodes are activated in step 48. The activation of latent peers in such invited nodes may occur upon receipt of the invitation to join. For example, a message may be sent through the IM network that has a link that activates the latent peer and passes the peer any information it needs to become part of the sharing network.

It should be appreciated that other verification procedures well known in the art, besides simply providing the unique virtual peer identifier, may be utilized for connecting to the aggregation node as part of the shared network represented by the identified virtual peer. In one example, the first originating node(s) to establish the network can pass around an additional token to invited users that must be presented to the aggregation node when an invited user decides to join. Also, private/public key mechanisms, rights or licensing schemes or other predetermined security parameters as are known in the art may be utilized. These latter options may be beneficial in order to prevent unauthorized peers from joining the virtual peer.

Figure 7:
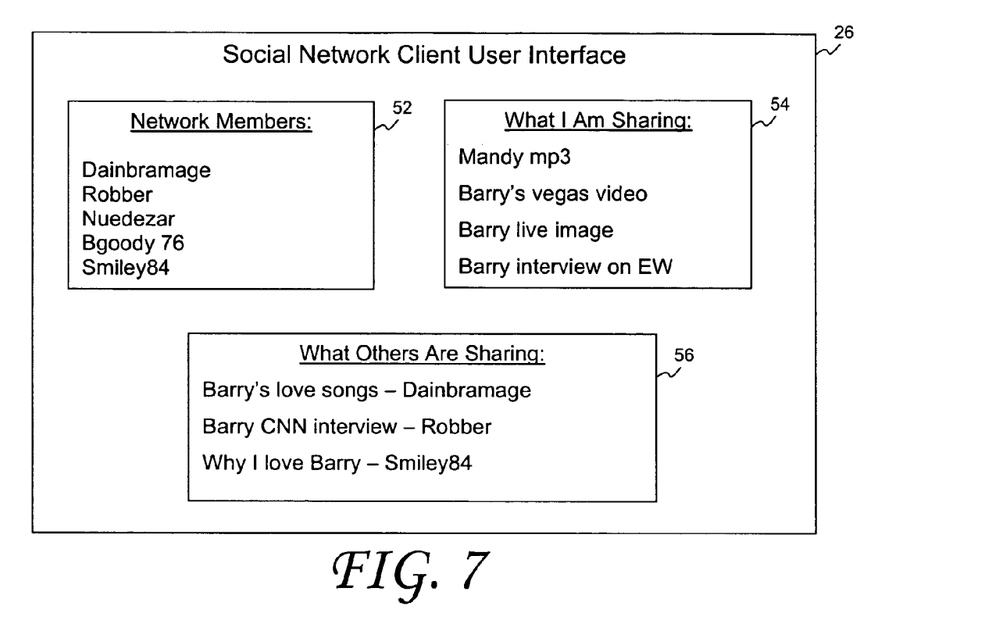
FIG. 7 illustrates an exemplary display via a user interface portion of the client structure represented in FIG. 3.

Once a virtual peer is established, such as in accordance with exemplary steps 40-51 provided and discussed with reference to FIG. 6, content may be shared among the connected network nodes as indicated in step 51. In one embodiment, content is shared in a controlled distribution based on each node's determined level distance in the social network. Each node may choose to share or not to share content with other nodes. A given node user may preferably be capable of viewing what others are sharing and/or what that given node user is sharing with the network. FIG. 7 provides an illustrative example of how such shared content may be graphically viewed by a given user via a user interface 26. In such example, a user is able to view a first display portion 52 including linked members in the content sharing network, a second display portion 54 including content that the given user is sharing, and a third display portion 56 indicating what content other linked users in the network are sharing.

In general, it should be appreciated that the aggregation of content and/or content metadata and associated displays or information provided to users in the sharing network may be configured in various default or user-selectable forms. In one example, metadata about the various pieces of digital content available from network nodes participating in the virtual peer configuration are collected by the aggregation node into one sharing view which is accessible by all node participants equally. In some embodiments, a node owner may limit how far and wide that owner's shared content is visible across the network. For example, a content owner may specify that content shared by that owner is only visible up to four levels away from that owner in the network. If desired, this type of display limitation can be applied based on certain predetermined criteria established by a content owner or by the virtual peer, including but not limited to content file, genre, type or other characterization parameter relevant to the particular form of digital content (e.g., video, audio, text, image, graphic, html, metadata, etc.)

In accordance with another method for sharing content on the virtual peer, a content owner can create FOAF level rights (such as briefly described with reference to FIG. 1) for distributed content. The content owner first creates the level rights for each allowable level within an allowed level limit, or degrees of separation, between the content owner and other potential receiving nodes in the network. After establishing the level rights, they are sent from the content owner to the aggregation node, which in such case functions at least in part as a proxy server. The content is then made available for sharing in the virtual peer. When a node member attempts to access the content, the aggregation node can calculate the distance in levels that the requesting member is from the originating node and creates the correct version of content for that node based on the established level rights and transfers that version of the content to the requesting node. This process of data modification in accordance with predetermined level rights is typically implemented by steps that are transparent to the receiving node. In an alternative embodiment, shared content may be transferred to a requesting node along with the level-rights appropriate for the requesting node's determined level distance from the originating node and the requesting node enforces the rights specified. It is important to note that in either of the methods for implementing content level-rights, a determination as to which level-rights are appropriate is made by the aggregation node when it determines the relative position between a requesting and originating node. This is different than situations where level-rights are determined based on invitations sent between sharing nodes at adjacent levels in the social network.

A still further aspect of content sharing that may be utilized in accordance with a virtual peer sharing network of the present disclosure concerns play lists. In content that is playable in a play list, such as music, video clips, images, or the like, the aggregation node can organize shared content into playlists to be played on each requesting node. In some exemplary embodiments, content can be played by streaming the content or by pushing/pulling the content onto the node. Additionally, content can be organized and played by node positions according to different preconfigured methods. For example, one exemplary playlist uses node position as a determining factor and places content on a play list relative to the position of the receiving node. For instance, content from nodes closer to the receiving node may be played first while nodes that are farther from the receiving node are played later on the play list. In another example, relative weights are assigned to different nodes in the network and those weights are used to determine which content is played first or last on the configured playlists. For instance, nodes that are more interconnected with other nodes on a social network may get their content played first.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention

What is claimed is:

1. A method of sharing content among social network nodes, comprising the following steps:
    connecting, by a first of a plurality of social network nodes, to an aggregation node, wherein the first of the plurality of social network nodes comprises embedded peer software enabling content sharing with others of the plurality of social network nodes that connect to the aggregation node;
    sending, by the aggregation node, an invitation to the others of the plurality of social network nodes to join the aggregation node, wherein each of the others of the plurality of social network nodes comprise embedded peer software;
    in response to the invitation, connecting, by each of the others of the plurality of social network nodes, to the aggregation node;
    forming a virtual peer comprising the aggregation node and the plurality of social network nodes, wherein all nodes participating in the virtual peer are collectively addressable by a unique identifier;
    obtaining, by the aggregation node, metadata describing at least one portion of selected pieces of digital content available for sharing from one of the plurality of social network nodes; and
    receiving level rights corresponding to the digital content from the one of the plurality of social network nodes, wherein the level rights identify access rights by the others of the plurality of social network nodes to the digital content.

2. The method of claim 1, further comprising a step of providing each of the plurality of social network nodes with a user interface for viewing content being shared by each of the plurality of social network nodes connected to the aggregation node.

3. The method of claim 2, wherein each social network node's user interface displays a list of identifiers for each social network node connected to the aggregation node.

4. The method of claim 2, further comprising a step of establishing a maximum limit of levels from an originating social network node that content shared by the originating social network node may be viewable by other social network nodes in a network.

5. The method of claim 1, wherein the aggregation node calculates a distance in levels between an originating social network node sharing given content and one or more recipient social network nodes receiving the given content, and creates a version of the given content in accordance with level rights established by the originating social network node for the calculated level of each recipient social network node.

6. The method of claim 1, wherein the aggregation node calculates a distance in levels between an originating social network node sharing given content and a recipient social network node receiving the given content, and sends the given content along with appropriate level rights for the calculated level to the recipient social network node.

7. A method of sharing content among social network nodes, comprising the following steps:
    connecting, by a first of a plurality of social network nodes, to an aggregation node, wherein the first of the plurality of social network nodes comprises embedded peer software enabling content sharing with others of the plurality of social network nodes that connect to the aggregation node;
    sending, by the aggregation node, an invitation to the others of the plurality of social network nodes to join the aggregation node, wherein each of the others of the plurality of social network nodes comprise embedded peer software;
    in response to the invitation, connecting, by each of the others of the plurality of social network nodes, to the aggregation node;
    forming a virtual peer comprising the at least one aggregation node and the plurality of social network nodes, wherein all nodes participating in the virtual peer are collectively addressable by a unique identifier;
    obtaining, by the aggregation node, metadata describing at least one portion of selected pieces of digital content available for sharing from one of the plurality of social network nodes; and
    organizing content shared by selected of the plurality of social network nodes into a playlist for access by selected of the plurality of social network nodes.

8. The method of claim 7, wherein the playlist created by the at least one aggregation node is organized from a perspective of one or more recipient social network nodes who are configured to access the playlist, and wherein the at least one aggregation node places content onto the playlist by node positions relative to a position of the one or more recipient nodes.

9. The method of claim 8, wherein the at least one aggregation node places content on a playlist for a given recipient node higher on the playlist for content from social network nodes that are closer in level distance to the given recipient node than content from social network nodes that are father away.

10. The method of claim 8, wherein the at least one aggregation node places content on a playlist for a given recipient node higher on the playlist for content from social network nodes that are more interconnected with other social network nodes than content from social network nodes that are less interconnected.

11. The method of claim 7, further comprising a step of granting an external node access to the virtual peer upon authorization by at least one of the plurality of social network nodes in the virtual peer.

12. The method of claim 7, wherein each of the plurality of social network nodes connecting to the virtual peer must provide a predetermined security parameter in order to connect to the virtual peer.

* * * * *